(12) United States Patent
Matsudo

(10) Patent No.: US 8,430,197 B2
(45) Date of Patent: Apr. 30, 2013

(54) SNOW VEHICLE

(75) Inventor: Shinichi Matsudo, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 526 days.

(21) Appl. No.: 11/956,859

(22) Filed: Dec. 14, 2007

(65) Prior Publication Data

US 2008/0185204 A1  Aug. 7, 2008

Related U.S. Application Data

(60) Provisional application No. 60/887,664, filed on Feb. 1, 2007.

(51) Int. Cl.
*B62M 27/02* (2006.01)

(52) U.S. Cl.
USPC .................. 180/190; 180/182; 180/184

(58) Field of Classification Search ............... 180/190, 180/182, 184
See application file for complete search history.

(56) References Cited

U.S. PATENT DOCUMENTS

| | | | | |
|---|---|---|---|---|
| 3,507,346 A * | 4/1970 | Hauser | | 180/193 |
| 3,698,497 A * | 10/1972 | Bombardier | | 180/190 |
| 5,660,245 A | 8/1997 | Marier et al. | | |
| 5,957,230 A * | 9/1999 | Harano et al. | | 180/68.4 |
| 6,170,589 B1 * | 1/2001 | Kawano et al. | | 180/190 |
| 6,464,033 B2 * | 10/2002 | Izumi et al. | | 180/291 |
| 7,188,693 B2 * | 3/2007 | Girouard et al. | | 180/184 |
| 7,255,068 B2 * | 8/2007 | Ashida | | 123/41.1 |
| 7,290,514 B2 * | 11/2007 | Hoi | | 123/90.33 |
| 7,413,046 B2 * | 8/2008 | Okada et al. | | 180/182 |
| 7,431,116 B2 * | 10/2008 | Ashida | | 180/190 |
| 7,578,366 B2 * | 8/2009 | Moji | | 180/182 |
| 2001/0047900 A1 * | 12/2001 | Fecteau et al. | | 180/190 |
| 2005/0115754 A1 * | 6/2005 | Watson et al. | | 180/190 |
| 2005/0199433 A1 * | 9/2005 | Abe et al. | | 180/190 |
| 2005/0236192 A1 * | 10/2005 | Hoi | | 180/9.25 |
| 2005/0247156 A1 * | 11/2005 | Vaisanen | | 74/493 |
| 2005/0252705 A1 * | 11/2005 | Abe et al. | | 180/190 |
| 2006/0042847 A1 * | 3/2006 | Rasidescu et al. | | 180/190 |
| 2006/0175107 A1 * | 8/2006 | Etou | | 180/190 |
| 2006/0219221 A1 * | 10/2006 | Tsuruta et al. | | 123/469 |
| 2006/0232028 A1 * | 10/2006 | Pard et al. | | 280/22.1 |
| 2007/0193801 A1 * | 8/2007 | Moji | | 180/190 |

* cited by examiner

*Primary Examiner* — Paul N Dickson
*Assistant Examiner* — Daniel Yeagley
(74) *Attorney, Agent, or Firm* — Keating & Bennett, LLP

(57) ABSTRACT

A snow vehicle includes a track belt unit having an endless track belt, an engine arranged to drive the track belt unit, a steering mechanism to which a pair of steerable skis positioned in a forward direction of the track belt unit and being steerable to the left and right are attached, and a handlebar section coupled to the steerable skis via the steering mechanism and adapted to be gripped by a rider. The handlebar section and the rear end of the cylinder head are in generally the same position in a longitudinal direction of the snow vehicle.

5 Claims, 5 Drawing Sheets

SNOW VEHICLE

BACKGROUND OF THE INVENTION

1. Field of the Invention

The present invention relates to a snow vehicle including a track belt unit with an endless track belt, and a pair of steerable skis positioned in a forward direction of the track belt unit and being steerable to the left and right.

2. Description of the Related Art

Conventional snow vehicles, or snowmobiles, including a track belt unit with an endless track belt, and a pair of steerable skis positioned in a forward direction of the track belt unit and being steerable to the left and right are generally designed such that a rider can straddle the vehicle in a position behind an engine for driving the track belt unit (see Japanese Patent No. 3412000 (pages 3 to 4 and FIG. 1)).

Unfortunately, the conventional snow vehicles of this type have the following problem. More specifically, since the rider straddles in a position behind the engine, there remains room for improvement in enhancing the moving performance of the snow vehicle by converging the inertial mass of the snow vehicle during straddling of the vehicle by the rider, that is, during driving.

SUMMARY OF THE INVENTION

In order to overcome the problems described above, preferred embodiments of the present invention provide a snow vehicle which provides more enhanced moving performance by converging the inertial mass of the snow vehicle, specifically the internal mass of the snow vehicle during driving the vehicle by a rider.

According to a preferred embodiment of the present invention, a snow vehicle includes a track belt unit having an endless track belt, an engine for driving the track belt unit, a steering mechanism to which a pair of steerable skis positioned in a forward direction of the track belt unit and being steerable to the left and right are attached, and a handlebar section coupled to the steerable skis via the steering mechanism and adapted to be gripped by a rider, in which the engine has a cylinder head, and the handlebar section and a rear end of the cylinder head are in generally the same position in a longitudinal direction of the snow vehicle.

The cylinder head is preferably inclined rearward of the snow vehicle.

The snow vehicle also preferably includes a rod-like steering shaft between the steerable skis and the handlebar section, the steering shaft being positioned above the cylinder head.

According to another preferred embodiment of the present invention, a snow vehicle includes a track belt unit having an endless track belt, an engine for driving the track belt unit, a steering mechanism to which a pair of steerable skis positioned in a forward direction of the track belt unit and being steerable to the left and right are attached, and a handlebar section coupled to the steerable skis via the steering mechanism and adapted to be gripped by a rider, in which the track belt unit has a drive shaft driven by the engine, and the handlebar section is positioned in a forward direction of the drive shaft.

According to another preferred embodiment of the present invention, a snow vehicle includes a track belt unit having an endless track belt, an engine for driving the track belt unit, a fuel tank for storing therein fuel to be supplied to the engine, and a steering mechanism to which a pair of steerable skis positioned in a forward direction of the track belt unit and being steerable to the left and right are attached, in which the engine has a cylinder head, and at least a portion of the fuel tank overlaps the cylinder head in a longitudinal direction of the snow vehicle.

The at least a portion of the fuel tank preferably overlaps the cylinder head in a longitudinal direction of the snow vehicle by more than half a longitudinal width of the cylinder head.

The cylinder head of the above-described preferred embodiment is preferably inclined rearward of the snow vehicle.

The snow vehicle also preferably includes a handlebar section coupled to the steerable skis via the steering mechanism and adapted to be gripped by a rider, and a rod-like steering shaft between the steerable skis and the handlebar section, the steering shaft being positioned above the cylinder head.

The fuel tank and the cylinder head preferably overlap each other as seen in a plan view of the snow vehicle.

The foregoing and other elements, features, steps, characteristics, aspects, and advantages of the present invention will become more apparent from the following detailed description of preferred embodiments the present invention when taken in conjunction with the accompanying drawings.

DETAILED DESCRIPTION OF THE PREFERRED EMBODIMENTS

Figure 1:
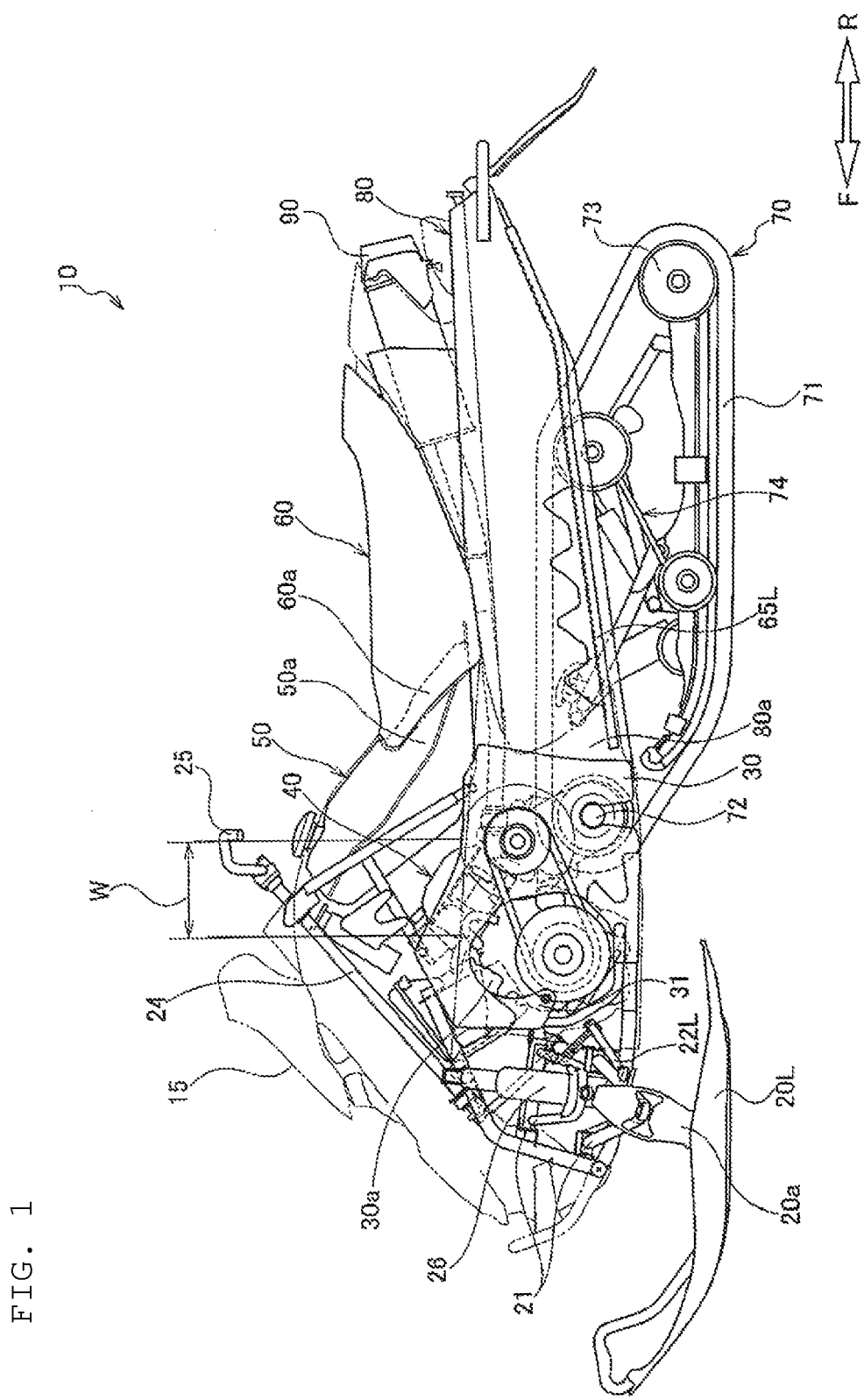
FIG. 1 is a left side elevation generally illustrating a snow vehicle in accordance with a preferred embodiment of the present invention.

Preferred embodiments of the present invention will now be described. In the following descriptions in regard to the drawings, identical or similar elements are denoted by the identical or similar reference numerals. It should be noted that each drawing is a schematic diagram, and may represent different dimensional ratios and the like from those of the actual vehicle.

Hence, specific dimensions and the like should be determined in consideration of the following descriptions. Furthermore, as a matter of course, different drawings include elements which have different dimensional relations and ratios.

General Structure of Snow Vehicle

Figure 2:
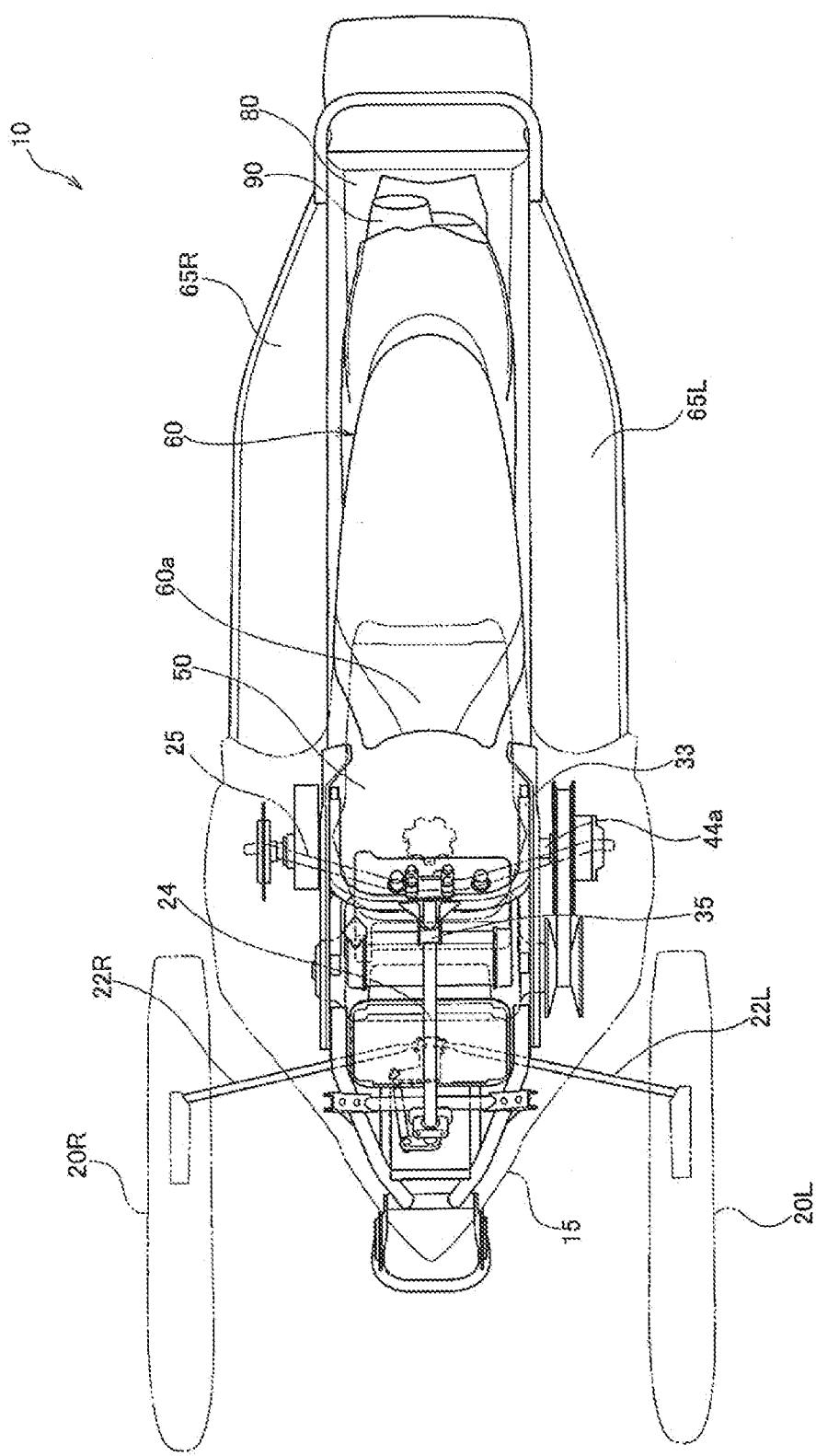
FIG. 2 is a plan view generally illustrating the snow vehicle in accordance with a preferred embodiment of the present invention.

Description will be first made of the general structure of a snowmobile 10 defining a snow vehicle in accordance with the present preferred embodiment. FIG. 1 is a left side elevation generally illustrating the snowmobile 10. FIG. 2 is a plan view generally illustrating the snowmobile 10.

As shown in FIGS. 1 and 2, the snowmobile 10 includes a track belt unit 70, and steerable skis 20L, 20R which are steerable to the left and right. The snowmobile 10 can be used for athletic events such as snowcross, and thus there is always a strong demand for its high moving performance.

The snowmobile 10 is designed such that the inertial mass will converge as a rider comes to a position that is the closest possible to the engine 40 having a heavy weight.

(1) Structure of Steering System

The steerable skis 20L, 20R are positioned in a forward direction of the track belt unit 70. The steerable ski 20L is supported by an arm 21 for left-and-right steering movement.

The steerable ski 20L (20R), specifically a knuckle 20a coupled to the steerable ski 20L, is coupled to a tie rod 22L (22R). The tie rods 22L, 22R are coupled to a link 23 (which is not shown in FIGS. 1 and 2; see FIG. 3).

A steering shaft 24 is coupled to the link 23. Specifically, the steering shaft 24 is coupled at the front end to the link 23. The steering shaft 24 is a rod-like steering shaft, and is positioned between the steerable skis 20L, 20R and a handlebar 25.

The handlebar 25 is coupled to the steerable skis 20L, 20R via the tie rods 22L, 22R, the link 23 and the steering shaft 24. The handlebar 25 can be gripped by the rider. In this preferred embodiment, the handlebar 25 defines a handlebar section.

The handlebar 25 preferably has hook-shaped left and right ends. This provides the rider increased flexibility in the riding position as the rider changes the gripping position of the handlebar 25.

The steerable ski 20L, 20R is coupled to a front suspension 26. The front suspension 26 allows the steerable ski 20L to move generally vertically in a manner absorbing the shock received by the steerable ski 20L. It should be understood that although not shown in FIGS. 1 and 2, the steerable ski 20R is also coupled to a front suspension that operates in the same manner as the front suspension 26.

The front suspension 26 preferably includes a coil spring (not shown) and a damper unit.

(2) Structure of Frame

The snowmobile 10 includes a front frame 30 and a rear frame 80 (see FIG. 2). The front frame 30 preferably includes a pair of left and right tabular members formed by die casting, for example.

A sub-frame 31 is coupled to the link 23. In other words, the sub-frame 31 and the front frame 30 are separate parts. The sub-frame 31 is fastened to the front frame 30 preferably with bolts (not shown). The sub-frame 31 is fastened to the front frame 30 after an engine 40 is attached to the front frame 30. The engine 40 is also coupled to the sub-frame 31.

The front frame 30 has a cutout 30a shaped so as to avoid interference with the engine 40 in the state where the sub-frame 31 is fastened to the front frame 30. The front frame 30, the engine 40 and others are shielded by a cowl 15.

The rear frame 80 is coupled at the front end 80a to the front frame 30 and extends rearward beyond the rear end of the track belt unit 70.

(3) Engine, Track Belt Unit and Others

The engine 40 preferably is an in-line, three cylinder, four-stroke engine. The engine 40 drives the track belt unit 70.

The track belt unit 70 includes a track belt 71, a front axle 72, a rear axle 73 and a rear suspension unit 74. The track belt 71 is an endless track belt. It is understood that the track belt 71 has a pattern of projecting ribs (not shown) on its surface which are arranged at certain intervals.

The front axle 72 is provided at the front end of the track belt unit 70. The front axle 72 is driven by the engine 40. The specific operating mechanism of the track belt unit 70 will be described below.

The rear axle 73 is provided at the rear end of the track belt unit 70. The track belt 71 is stretched between the front axle 72 and the rear axle 73. On the inside of the track belt 71, there is disposed the rear suspension unit 74.

A fuel tank 50 stores therein fuel to be supplied to the engine 40. The fuel tank 50 is disposed above the front frame 30 and the rear frame 80. The fuel tank 50 is shaped so as to rise obliquely upward of the snowmobile 10 from the front frame 30 and the rear frame 80.

Behind the fuel tank 50, a seat 60 to be straddled by the rider is disposed. The front end 60a of the seat 60 covers the rear end 50a of the fuel tank 50.

In a position below the seat 60, there are disposed footrests 65L, 65R on which the rider can rest his/her feet. The footrests 65L, 65R are coupled to the rear frame 80.

A muffler 90 communicates with the engine 40. The muffler 90 serves to reduce the volume of the operating noise from the engine 40 and emit an exhaust gas rearward of the snowmobile 10.

Specific Structure of Front Portion of Snow Vehicle

Figure 3:
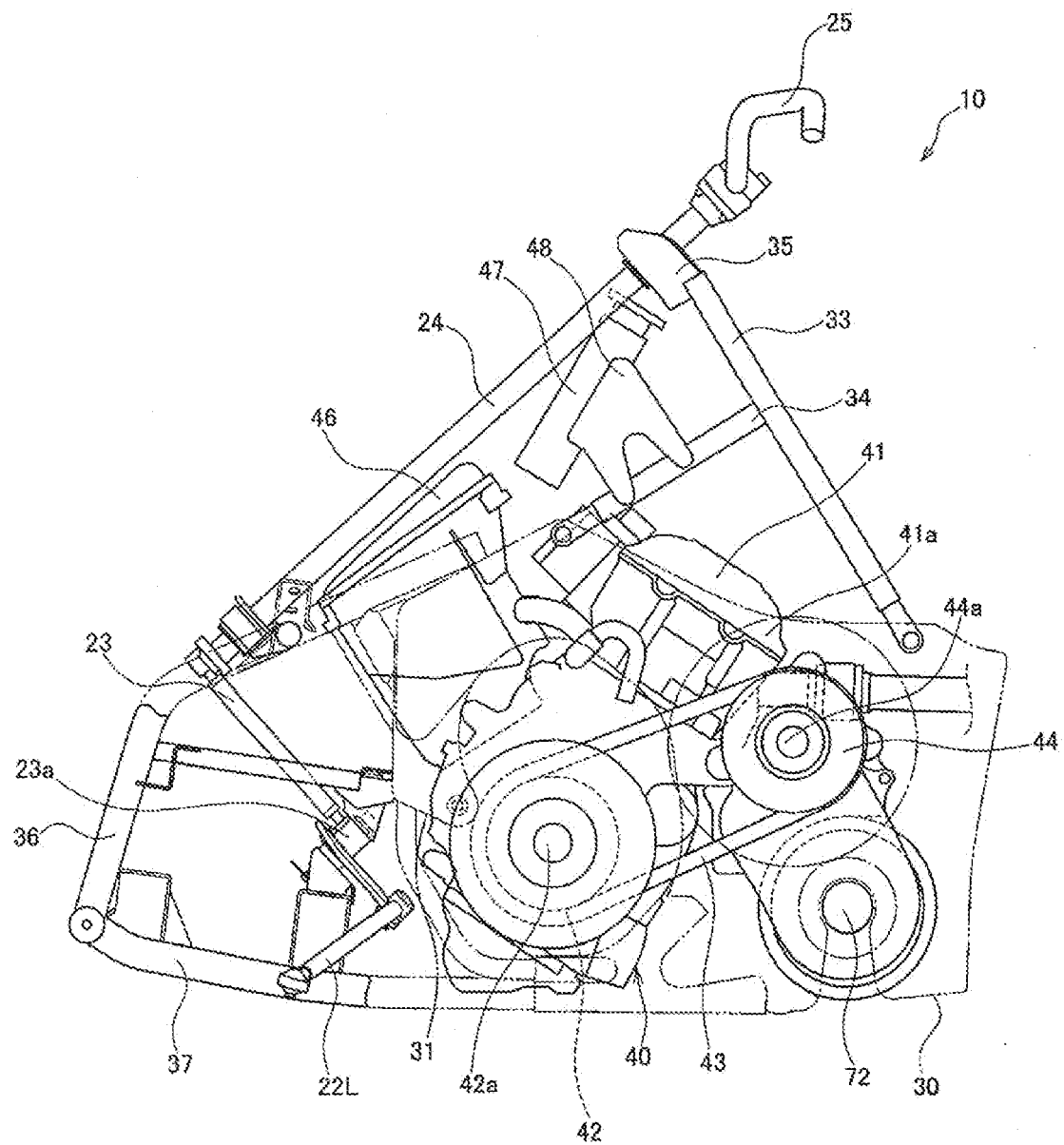
FIG. 3 is an enlarged left side elevation of a front part of the snow vehicle in accordance with a preferred embodiment of the present invention.

Description will now be made of the specific structure of a front portion of the snowmobile 10 involving an essential portion of the present invention. FIG. 3 is an enlarged left side elevation of a front portion of the snowmobile 10. As described above, the engine 40 is attached to the front frame 30.

The engine 40 has a cylinder head 41. The engine 40, specifically the cylinder head 41, is inclined rearward of the snowmobile 10. The rear end 41a of the cylinder head 41 is in generally the same position as the handlebar 25 in a longitudinal direction of the snowmobile 10 (F-R direction in the figure).

The engine 40 has a crankshaft 42a. On the crankshaft 42a, a pulley 42 is mounted. In a position closely behind the engine 40, there is disposed a pulley 44 mounted on a pulley shaft 44a. The pulley shaft 44a is rotatably supported by the front frame 30. Between the pulley 42 and the pulley 44, a drive belt 43 is stretched.

As shown in FIG. 2, the pulley shaft 44a extends to the right side of the snowmobile 10. A drive gear (not shown) is rotatably attached to a generally middle portion of the pulley shaft 44a in a vehicle width direction.

The front axle 72 is rotated by the drive gear. That is, the track belt unit 70 is driven by the engine 40. In this preferred embodiment, the front axle 72 defines a drive shaft.

To the front frame 30, an upper frame 33 is coupled. As shown in FIG. 2, the upper frame 33 is arranged to extend along the periphery of the fuel tank 50. The upper frame 33 extends toward the handlebar 25, that is, obliquely upward and forward of the snowmobile 10.

A sub-frame 34 is coupled to the front frame 30 and the upper frame 33. At the upper end of the upper frame 33, there is provided a steering shaft support 35. The steering shaft support 35 rotatably supports the steering shaft 24.

The front frame 30 is also coupled to a front end frame 36 disposed at the front end of the snowmobile 10. At the front end of the snowmobile 10, the front end frame 36 is coupled at the lower end to a lower end frame 37. The lower end frame 37 is coupled at the rear end to the front frame 30.

A coupling portion 23a between the tie rod 22L and the link 23 is supported by the lower end frame 37. In this preferred embodiment, the arm 21 (see FIG. 1), the tie rod 22L (22R) and the link 23 constitute a steering mechanism to which the steerable ski 20L (20R) is attached.

The steering shaft 24 coupled to the link 23 is positioned above the engine 40, specifically the cylinder head 41. The handlebar 25 is positioned in a forward direction of the front axle 72.

In a position below the steering shaft 24, an air cleaner 46 and a radiator 47 are disposed. The air cleaner 46 is positioned between the steering shaft 24 and the engine 40. The radiator 47 is positioned above the air cleaner 46. The radiator 47 is positioned above the engine 40, specifically the cylinder head 41. The radiator 47 is also supported by a bracket 48 attached to the sub-frame 34.

Arrangement and Structure of Fuel Tank

Description will now be made of the arrangement and structure of the fuel tank 50. As shown in FIG. 1, at least a portion of the fuel tank 50 overlaps the cylinder head 41 in a longitudinal direction of the snowmobile 10. Specifically, the fuel tank 50 preferably overlaps the cylinder head 41 in a longitudinal direction of the snowmobile 10 (F-R direction in the figure) by more than half the longitudinal width W of the cylinder head 41.

Also, as shown in FIG. 2, the fuel tank 50 and the cylinder head 41 overlap each other as seen in the plan view of the snowmobile 10.

Figure 4:
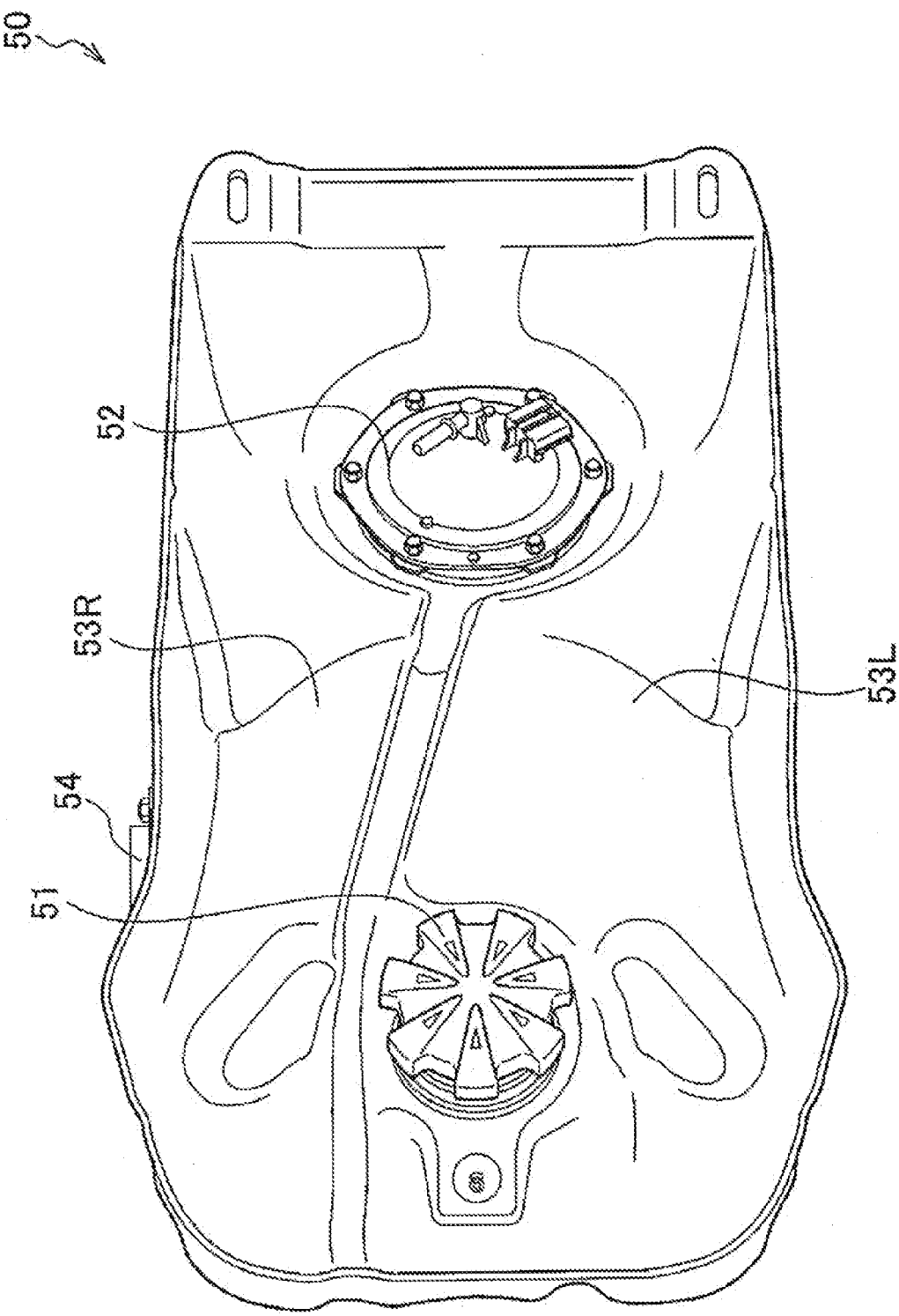
FIG. 4 is a plan view of a fuel tank in accordance with a preferred embodiment of the present invention.
Figure 5:
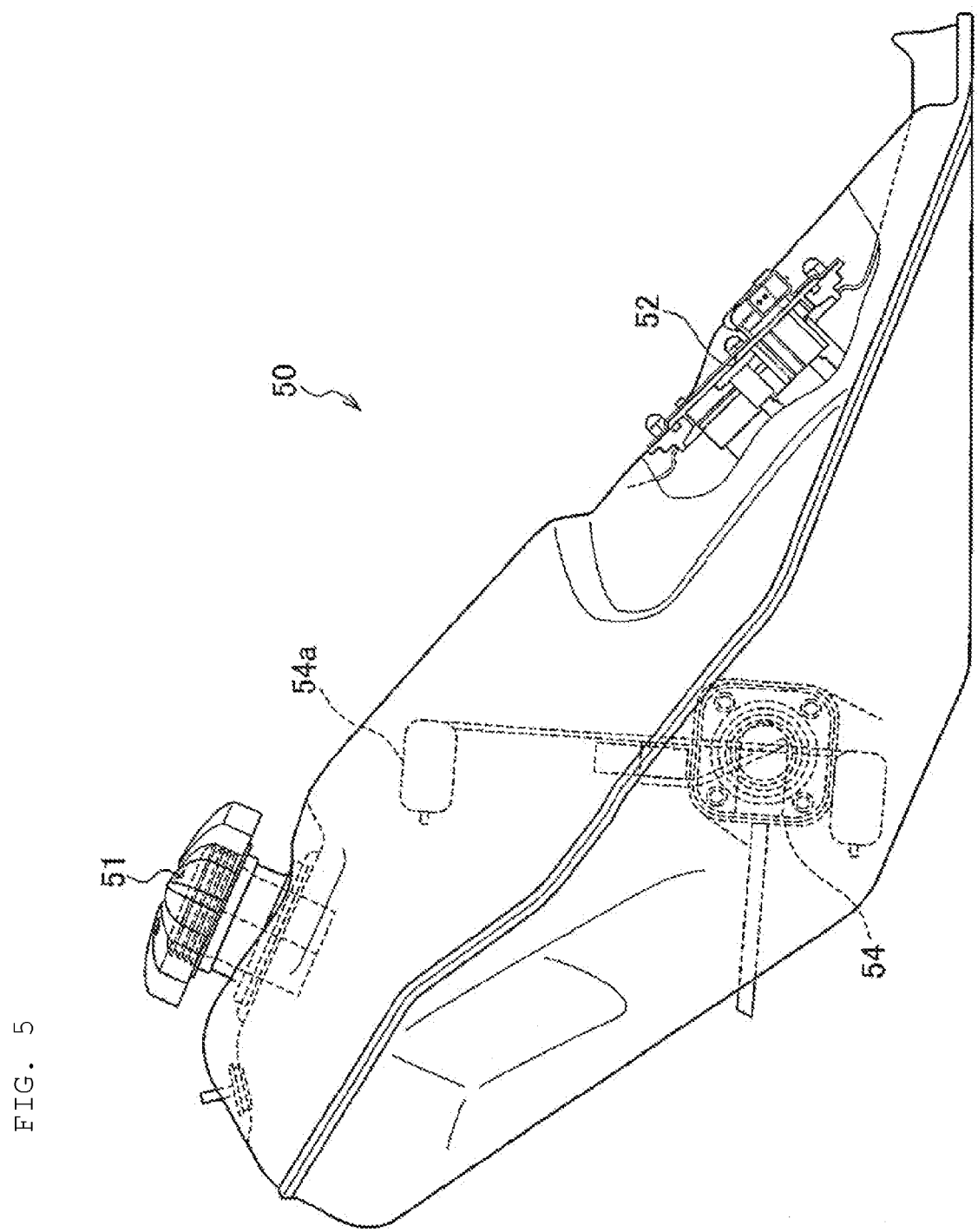
FIG. 5 is a left side elevation of the fuel tank in accordance with a preferred embodiment of the present invention.

FIG. 4 is a plan view of the fuel tank 50. FIG. 5 is a left side elevation of the fuel tank 50. As shown in FIGS. 4 and 5, a removable cap 51 is attached to an upper portion of the front face of the fuel tank 50. Removing the cap 51 allows the user to pump fuel (gasoline) into the fuel tank from an oil inlet (not shown).

A fuel pump 52 is attached to a lower portion of the front surface of the fuel tank 50. The fuel pump 52 can deliver fuel stored in the fuel tank 50 to the engine 40, specifically a throttle body (not shown).

On the left side of the fuel tank 50, a curved portion 53L is provided. Similarly, on the right side of the fuel tank 50, a curved portion 53R is provided. The curved portions 53L, 53R are gradually curved outwardly toward a front portion of the fuel tank 50 so as not to interfere with the movement of the rider's legs while the rider is in a standing position.

A fuel level monitor unit 54 is attached to the right side of the fuel tank 50. The fuel level monitor unit 54 has a float 54a, and monitors the level of the fuel stored in the fuel tank 50. The fuel level monitor unit 54 can output a signal corresponding to a fuel level that the monitor unit monitored.

Function and Effects

In the snowmobile 10, the handlebar 25 and the rear end 41a of the cylinder head 41 are in generally the same position in a longitudinal direction of the snowmobile 10. As a result, the straddling position of the rider who is gripping the handlebar 25 is closer to the engine 40. As the straddling position of the rider gets closer to the engine 40, the inertial mass of the snowmobile 10 including the rider will converge during driving of the snowmobile by the rider. More specifically, the moving performance of the snowmobile 10 improves.

In this preferred embodiment, the cylinder 41 is preferably inclined rearward of the snowmobile 10. Further, the steering shaft 24 is preferably positioned above the cylinder head 41. More specifically, since the cylinder head 41 is inclined rearward and the steering shaft 24 is positioned above the inclined cylinder head 41, this preferred embodiment provides a reduction in the exterior size of the snowmobile 10. This helps the inertial mass of the snowmobile 10 converge more easily, which provides the enhanced moving performance of the snowmobile 10.

In this preferred embodiment, the handlebar 25 is positioned in a forward direction of the front axle 72 of the track belt unit 70. As a result, the straddling position of the rider who is gripping the handlebar 25 becomes closer to the engine 40, which drives the trackbelt unit 70. As the straddling position of the rider gets closer to the engine 40, the inertial mass of the snowmobile 10 including the rider will converge while the rider is driving the snowmobile. More specifically, the moving performance of the snowmobile 10 improves.

In this preferred embodiment, at least a portion of the fuel tank 50 overlaps the cylinder head 41 in a longitudinal direction of the snowmobile 10. As a result, the engine 40 and the fuel tank 50 both having a relatively heavy weight are positioned closer to each other. Thus, the inertial mass of the snowmobile 10 will converge, providing the enhanced moving performance of the snowmobile 10.

Other Preferred Embodiments

Heretofore, while the present invention has been described based on the above preferred embodiment, it should be understood that the description and the drawings forming a part of this disclosure do not limit the scope of this invention. Alternative preferred embodiments based on the disclosure will be apparent to those skilled in the art.

For example, in the foregoing preferred embodiment, the steering shaft 24 is preferably positioned above the cylinder head 41. However, the steering shaft 24 may not necessarily be positioned above the cylinder head 41. In one example, the steering shaft 24 may be positioned on the lateral sides of the cylinder head 41.

In the foregoing preferred embodiment, at least a portion of the fuel tank 50 preferably overlaps the cylinder head 41 in a longitudinal direction of the snowmobile 10. However, the fuel tank 50 may not overlap the cylinder head 41.

In the foregoing preferred embodiment, the cylinder head 41 is preferably inclined rearward of the snowmobile 10. However, the cylinder head 41 may not be inclined rearward.

In the foregoing preferred embodiment, the handlebar 25 is preferably positioned in a forward direction of the front axle 72 of the track belt unit 70. However, the handlebar 25 may not be positioned in a forward direction of the front axle 72.

Thus, as a matter of course, the present invention includes various preferred embodiments that are not described herein. Hence, the technical scope of the present invention is defined only by particular matters of the invention as set forth in the appended claims.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A snow vehicle comprising:
   a track belt unit having an endless track belt;
   an engine arranged to drive the track belt unit and including a cylinder head;
   a fuel tank arranged to store therein fuel to be supplied to the engine;
   a seat upon which a rider sits, the seat arranged to at least partially overlap a rear portion of the fuel tank in a longitudinal direction of the snow vehicle and a front portion of the fuel tank is arranged above the seat in a vertical direction of the snow vehicle;
   a steering mechanism to which a pair of steerable skis positioned in a forward direction of the track belt unit and being steerable to the left and right are attached, the steering mechanism including a steering shaft;
   a handlebar section coupled to the steerable skis via the steering mechanism and adapted to be gripped by a rider, the handlebar section coupled to a top end of the steering shaft; and
   a frame including a steering shaft support arranged at a top of the frame, the steering shaft support arranged to support the steering shaft for pivotal movement; wherein
   the handlebar section and a rear end of the cylinder head are in generally the same position in the longitudinal direction of the snow vehicle; and in a lateral side view of the snow vehicle, a top of the cylinder head is positioned directly under the steering shaft support; wherein the at least a portion of the fuel tank overlaps the cylinder head in the longitudinal direction of the snow vehicle by more than half a longitudinal width of the cylinder head; and the cylinder head is inclined toward a rear of the snow vehicle.

2. A snow vehicle comprising:

a track belt unit having an endless track belt;

an engine arranged to drive the track belt unit and including a cylinder head;

a fuel tank arranged to store therein fuel to be supplied to the engine;

a seat upon which a rider sits, the seat arranged to at least partially overlap a rear portion of the fuel tank in a longitudinal direction of the snow vehicle and a front portion of the fuel tank is arranged above the seat in a vertical direction of the snow vehicle;

a steering mechanism to which a pair of steerable skis positioned in a forward direction of the track belt unit and being steerable to the left and right are attached, the steering mechanism including a steering shaft; and a frame including a steering shaft support arranged at a top of the frame, the steering shaft support arranged to support the steering shaft for pivotal movement; wherein at least a portion of the fuel tank overlaps the cylinder head in the longitudinal direction of the snow vehicle;

at least a portion of the fuel tank overlaps the steering shaft support of the frame in a plan view of the vehicle; and the cylinder head is inclined toward a rear of the snow vehicle.

3. The snow vehicle according to claim 2, wherein the at least a portion of the fuel tank overlaps the cylinder head in the longitudinal direction of the snow vehicle by more than half a longitudinal width of the cylinder head.

4. The snow vehicle according to claim 2, further comprising a handlebar section coupled to the steerable skis via the steering mechanism and adapted to be gripped by a rider, wherein the steering shaft is arranged between the steerable skis and the handlebar section, and the steering shaft is positioned above the cylinder head.

5. The snow vehicle according to claim 2, wherein the fuel tank and the cylinder head overlap each other as seen in a plan view of the snow vehicle.

\* \* \* \* \*